Patented June 7, 1932

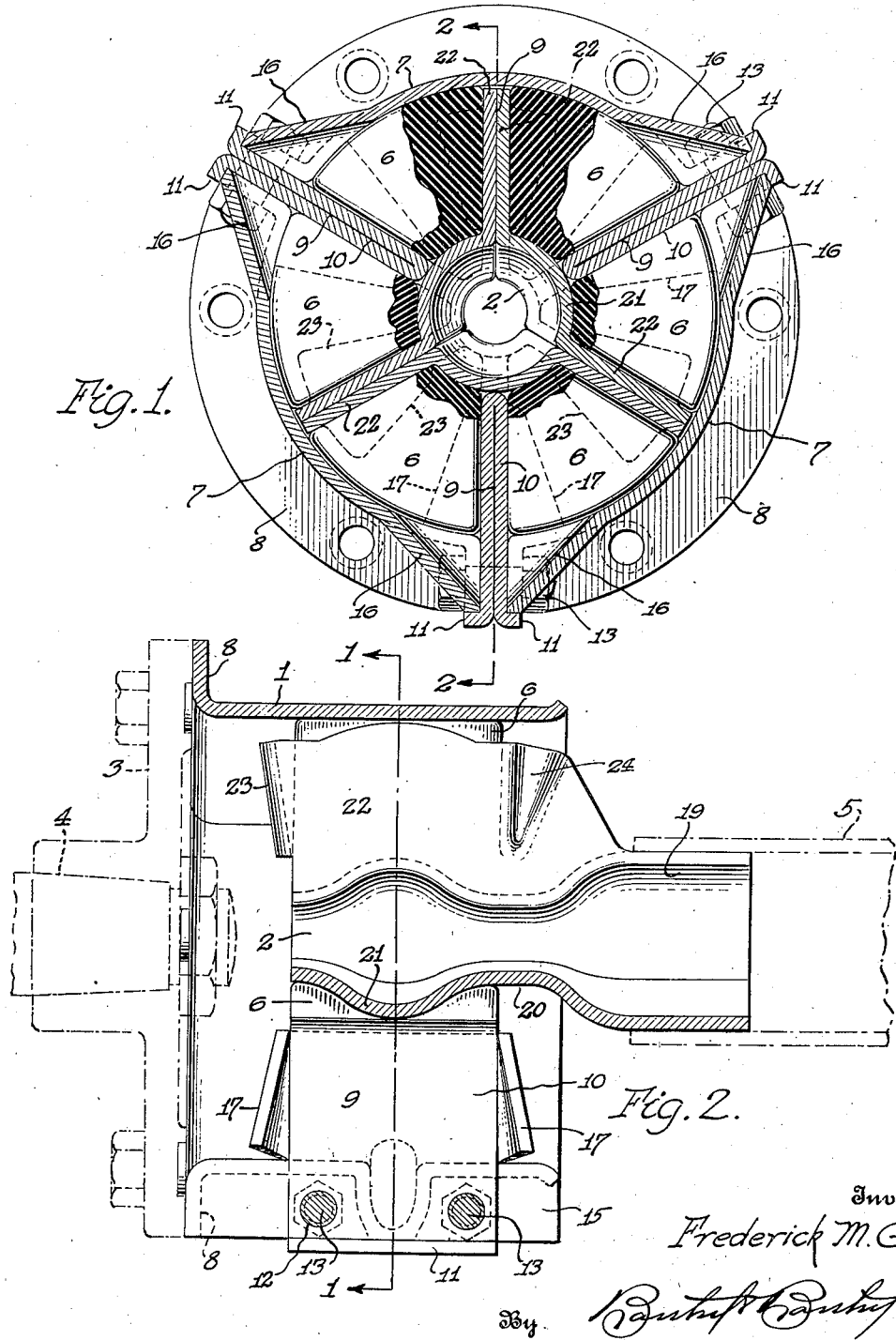

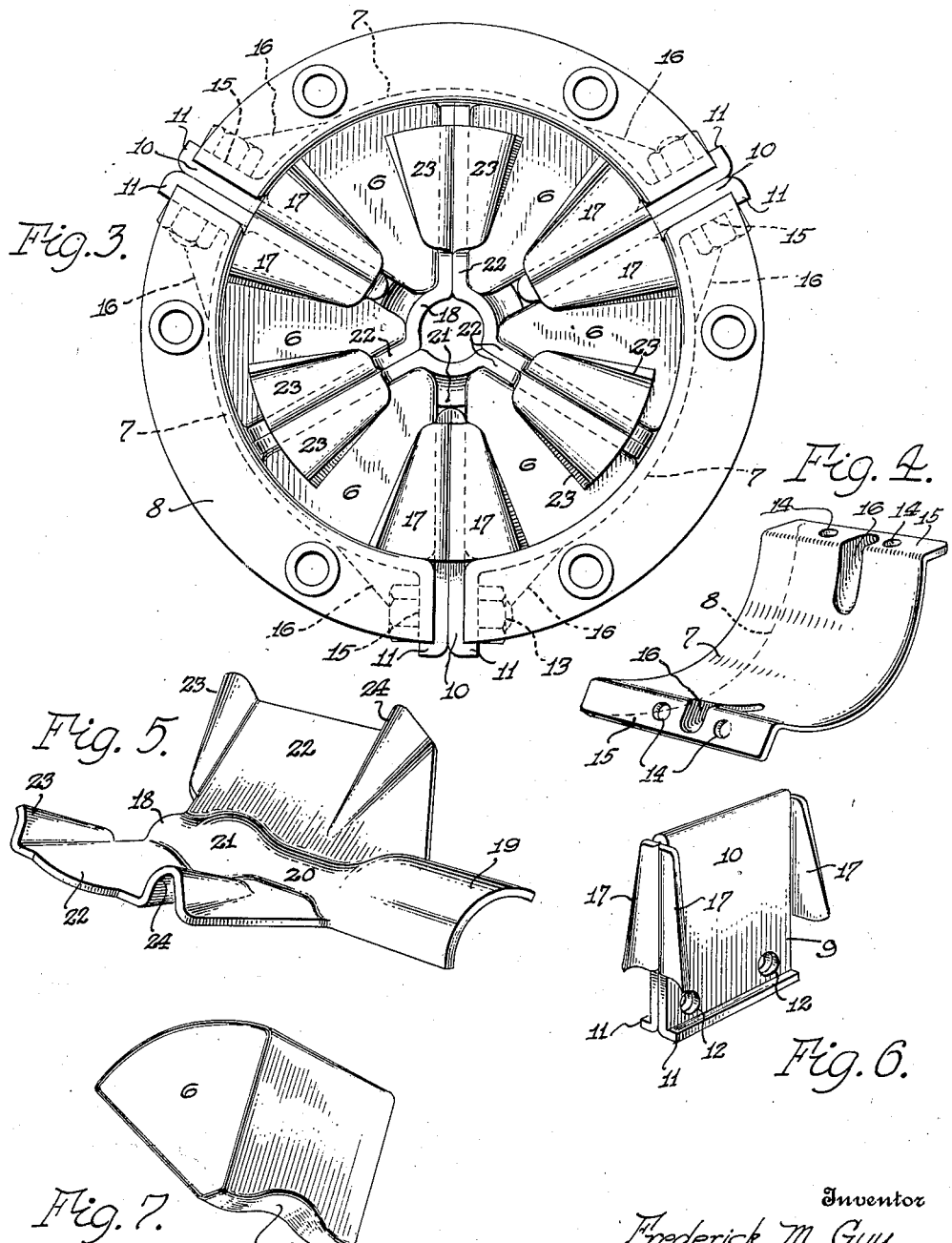

1,862,140

UNITED STATES PATENT OFFICE

FREDERICK M. GUY, OF DETROIT, MICHIGAN, ASSIGNOR, BY DIRECT AND MESNE ASSIGNMENTS, TO GUY AND MURTON, INCORPORATED, OF DETROIT, MICHIGAN, A CORPORATION OF MICHIGAN

UNIVERSAL JOINT

Application filed March 21, 1928. Serial No. 263,262.

This invention relates to a universal joint coupling between driving and driven members and to a device of this character which is particularly adapted for use in motor vehicle constructions. Objects of the invention are, in general, to eliminate metal to metal engagement between the relatively movable elements of the device, with the resultant wear, noise, and necessity for lubrication, and to provide a construction which is simple and cheap to manufacture, lending itself admirably to present day production methods.

With these and other ends in view, it is proposed to incorporate non-metallic yieldable bodies between the driving and driven elements, said bodies serving as the sole means for transmitting the driving torque, and at the same time affording a yieldable connection to take care of the axial dis-alignment of the elements and end thrust, no driving torque being transmitted at any point by metal to metal contact. Further, the construction is such that the entire metal structure may be formed of metal stampings, and yieldable non-metallic bodies will form the driving connection between the driving and driven members and these bodies will be confined in a manner to operate under compression in taking both driving torque and end thrust.

Referring to the accompanying drawings,

Figure 1 is a transverse section substantially upon the line 1—1 of Figure 2, of a device illustrative of an embodiment of the present invention, with parts partly broken broken away and partly in elevation to more clearly disclose the construction;

Fig. 2 is a longitudinal section substantially upon the line 2—2 of Figure 1;

Fig. 3 is an end elevation;

Fig. 4 is a perspective detail of a casing segment;

Fig. 5 is a perspective view of one of the several stampings from which the inner member of the device is formed;

Fig. 6 is a perspective view of one of the outer abutment members, detached; and Fig. 7 is a perspective view of one of a series of yieldable blocks forming the driving connection between the inner and outer members of the device.

The present structure or universal joint includes an outer cylindrical casing indicated as a whole by the numeral 1 and an inner structure indicated as a whole by the numeral 2, said casing being rigidly secured at one end to a flange or disk member 3 on a shaft 4 indicated in dotted lines in Figure 2, said inner structure 2 being rigidly secured to a second shaft 5 also indicated in dotted lines in Figure 2, with said inner structure positioned within said casing, connected thereto and held in place therein by means of a series of non-metallic blocks 6. The inner structure has a yielding angular movement relative to said casing due to the yieldability of said blocks which are formed of rubber or other suitable non-metallic yieldable and resilient material, and therefore the device serves as a universal connection between the rotative shafts 4 and 5 for transmitting driving torque from one to the other of said shafts and permitting relative angular movement of said shafts during rotation.

To facilitate the formation and assembly, the casing 1 is made up of a plurality of segmental sheet metal stampings 7 each formed with an outturned edge flange 8 provided with openings to receive bolts (not shown) for rigidly securing the assembled casing to the disk 3 on the shaft 4 or to any other member from or to which motion is to be transmitted through the universal joint structure, and to engage the rubber blocks 6, inwardly projecting abutments 9 are secured to the casing, each abutment being formed from a sheet metal blank folded upon itself to form the main wall or body 10 of the blade or abutment, end edge portions of the blank being turned laterally in opposite directions to form end flanges 11 and the wall adjacent said flanges being provided with openings 12 to receive bolts 13 which pass through like openings 14 in end flanges 15 on the segments 7, thus securing said abutment members 9 rigidly in place between adjacent ends of the segments forming the cylindrical casing. The flanges 11 engage over the outer edges of the end flanges 15 and said abutments are firmly clamped between the flanged ends of the segments, the abutment being further braced and held by forming a depression 16 in each end of each segment, the metal being struck outwardly and thus forming braces extending across the meeting angles of the body of each segment 7 and its end flanges 15 between the bolts 13. The abutments 9 are thus rigidly secured to the casing 1 and extend radially inward therefrom between the blocks 6 of each pair of blocks, said abutments being each formed with laterally and oppositely extending end flanges 17 at each end by bending edge portions of the metal wall 10 of each abutment laterally, these flanges 17 being provided to engage the ends of the pairs of blocks between which the abutments extend.

The inner member 2, or what may be the driven member of the structure, comprises a plurality of sheet metal stampings 18, one of which is shown in detail in Figure 5, and these stampings when fitted together, form a tubular axial portion with radially extending wings forming abutments to project between adjacent blocks of the several pairs of blocks, each stamping comprising an endwise projecting portion 19 forming a segment of a tubular portion adapted to fit closely within an end of the tubular shaft 5 which thus serves to hold the several stampings 18 in assembled relation. The axial tubular portion of this inner member 2 is formed by a contracted continuation of the portion 19, as shown at 20 and this segmental tubular portion 20 is preferably expanded and rounded as at 21, thus forming when the parts are assembled, a semispherical enlargement of the axial tube. The blank from which the stamping 18 is formed, is so shaped as to provide wings 22 integral with the tubular portions 20 and 21 extending radially outward therefrom, each wing being formed with an end edge flange 23 and a deep rib 24 tapering inwardly from the outer edge of the wing toward the neck portion 20 between the enlargement 21 and the projecting tube segment 19. When these stampings 18 are in assembled position the wings 22 of one stamping lie flat against like wings of adjacent stampings and thus each pair of wings serves the purpose of an abutment, extending radially outward from the axial tubular portion formed by the assembled stampings, each of these abutments thus formed extending radially outward between adjacent blocks 6, which blocks are of segmental shape in cross section to fit snugly between the abutments formed by the wings 22 and the abutments 9. These blocks are also of a length to fit closely between the flanges 23 and the ribs 24, which flanges and ribs, together with the flanges 17 on the outer abutments 9, form walls to engage the ends of the blocks and thus prevent relative endwise movement between the casing or driving and inner or driven members.

When the assembled inner member 2 is placed within the casing 1 with the abutments 9 on the casing alternating with the abutments 22 on the inner member 2, said abutments together form pockets within the casing in which the rubber blocks 6 fit closely, the flanges 17 on the abutments 9 and the flanges 23 and ribs 24 on the abutments 22 of the inner member 2 forming the end walls of such pockets so that end thrust of the driven member is taken by these blocks which are adapted to yield slightly. These blocks completely fill the pockets thus formed and thus hold the inner member 2 centered within the casing with said parts spaced apart so that there is no metal to metal contact at any time therebetween, and as the blocks fill the pockets and are placed therein under compression, disintegration of the blocks due to relative movement of the casing and inner member, is reduced to the minimum. Relative longitudinal movement between casing and inner or driven member is also resisted by forming each block with a depression 25 in its inner edge portion to fit over the center enlargement 21 and by this method of confining each block between an abutment on the casing at one side of the block and an abutment on the inner member at the other side of the block, the blocks are put under compression in transmitting driving torque from the driving to the driven members as distinguished from a shearing action and therefore these blocks will have long life and may be formed of a material having a greater degree of resiliency, thus giving a maximum of relative angular movement of the driving and driven members without undue resistance. By the arrangement whereby each block is engaged at its ends by the flanges on said abutments, end thrust is taken yieldingly by said blocks, and as all motion is transmitted from the driving to the driven members by these blocks of non-metallic material without metal to metal contact, all noise is eliminated and the necessity for lubrication is obviated.

Obviously changes may be made in the construction and arrangement to adapt the device to the particular installation and other changes are contemplated as falling within the scope of the appended claims without departing from the spirit of the invention.

Having thus fully described my invention, what I claim is:—

1. A universal joint including an outer cylindrical casing formed of a plurality of segmental members and inwardly extending abutments secured between the adjacent ends of said segments, an inner member having abutments interposed between the abutments on the casing, and non-metallic resilient blocks interposed between adjacent abutments.

2. A universal joint including an outer cylindrical casing provided with inwardly extending members, an inner member in the casing comprising a plurality of separate sheet metal stampings together forming a tubular axial portion with integral outwardly extending radial members projecting between the inwardly extending members on the casing, each stamping forming a segment of said tubular portion with laterally extending integral wings together forming said outwardly extending radial members, and rubber blocks interposed between the inwardly extending members on the casing and the outwardly extending members on the inner member.

3. A universal joint including a cylindrical casing formed of a plurality of sheet metal stampings of segmental form with outturned flanges at the ends of said segments and sheet metal stampings forming abutment members secured at their outer ends between the flanged ends of said segments with their inner ends extending radially inward from the casing, an inner member with the casing formed of a plurality of sections each section comprising a sheet metal stamping formed to provide a segment of a tubular axial member with integral outwardly extending wings, said wings of said sections mating to form radial abutment members, and a plurality of rubber blocks in the casing filling the spaces between adjacent abutments, each engaged at one side by an abutment on the casing and at its opposite side by an abutment on the inner member.

In testimony whereof I affix my signature.

FREDERICK M. GUY.